United States Patent
Chun et al.

(10) Patent No.: US 8,322,387 B2
(45) Date of Patent: Dec. 4, 2012

(54) TIRE WITH DECOUPLING GROOVE FOR TRUCK/BUS

(75) Inventors: Yun Chang Chun, Daejeon (KR); Seung Jong Park, Daejeon (KR)

(73) Assignee: Hankook Tire Co., Ltd. (KR)

( * ) Notice: Subject to any disclaimer, the term of this patent is extended or adjusted under 35 U.S.C. 154(b) by 924 days.

(21) Appl. No.: 12/080,471

(22) Filed: Apr. 2, 2008

(65) Prior Publication Data

US 2009/0133792 A1 May 28, 2009

(30) Foreign Application Priority Data

Nov. 22, 2007 (KR) .................. 10-2007-0119807

(51) Int. Cl.
*B60C 11/01* (2006.01)
*B60C 11/13* (2006.01)

(52) U.S. Cl. .......... 152/209.16; 152/209.18; 152/209.27

(58) Field of Classification Search ............. 152/209.16, 152/209.18, 209.23, 209.27
See application file for complete search history.

(56) References Cited

U.S. PATENT DOCUMENTS

| | | | | |
|---|---|---|---|---|
| 4,995,437 A | * | 2/1991 | Enoki et al. | 152/209.16 |
| 5,522,442 A | * | 6/1996 | Kishi | 152/209.16 |
| 5,769,977 A | * | 6/1998 | Masaoka | 152/209.23 |
| 6,109,316 A | * | 8/2000 | Janajreh | 152/209.16 |
| 6,681,823 B2 | * | 1/2004 | Nakamura | 152/209.16 |
| 7,431,062 B2 | * | 10/2008 | Gojo | 152/209.16 |

FOREIGN PATENT DOCUMENTS

| | | | |
|---|---|---|---|
| JP | 07-164825 | * | 6/1995 |
| JP | 11-048716 | * | 2/1999 |
| JP | 2007-203971 | * | 8/2007 |

* cited by examiner

*Primary Examiner* — Justin Fischer
*Assistant Examiner* — Robert Dye
(74) *Attorney, Agent, or Firm* — Blakely, Sokoloff, Taylor & Zafman

(57) ABSTRACT

Disclosed is a truck/bus tire that has an improved decoupling groove capable of suppressing unbalanced wear of a shoulder rib and preventing side chipping of a tread, and that has enhanced durability of a belt. The tire has a decoupling groove formed between an outermost rib and a tread lateral side. An offset structure is provided by cutting off a portion around a start point where a virtual line extending from a distal end of the outermost rib of the tread intersects a virtual line extending from the tread lateral side. A side of the outermost rib is parallel to the tread lateral side and the cut-off portion is formed with a "<"-shaped groove. A sacrifice rib protruding from the "<"-shaped groove is formed coplanar with the start point located on the virtual line extending from the tread lateral side.

4 Claims, 4 Drawing Sheets

TIRE WITH DECOUPLING GROOVE FOR TRUCK/BUS

BACKGROUND OF THE INVENTION

1. Field of the Invention

The present invention relates to a tire for trucks/buses that has an improved decoupling groove capable of preventing uneven wear of a shoulder rib while providing a proper grip to a shoulder, and more particularly to a tire for trucks/buses that has an improved decoupling groove capable of suppressing unbalanced wear of a shoulder rib, preventing side chipping of a tread, and enhancing durability of a belt.

2. Description of the Related Art

Heavy load tires, such as truck tires, bus tires and the like, have higher load capacity, wear resistance, and stiffness than car tires. Such a heavy load tire is formed with a decoupling groove between a tread and a shoulder. To prevent uneven wear of a shoulder rib, the decoupling groove is formed narrowly at an edge of the shoulder to maintain a proper grip of the shoulder.

In a conventional tire, a decoupling groove generally undergoes irregular wear or uneven wear which tends to occur on opposite outermost ribs $101a$ of a tread $101$ as shown in FIG. 2. This is because the maximum friction is generally exerted on the outermost ribs $101a$. In this regard, although the irregular wear can be suppressed by adjusting a shape of a tire casing, there is the possibility of failure in suppressing the irregular wear through shape adjustment of the tire casing due to external environmental conditions such as vehicle alignment, road conditions, etc.

To further improve wear resistance under such extreme conditions, the tire is provided with a decoupling groove $104$ also called a sacrifice rib $105$. In this case, friction on the outermost rib $101a$ is intentionally concentrated on the sacrifice rib $105$, so that wear of the outermost rib $101a$ of the tread $101$ can be suppressed by accelerating wear of the sacrifice rib $105$.

Since the outermost rib $101a$ and the sacrifice rib $105$ are separated from each other via the decoupling groove $104$, not only is transfer of the irregular wear from the sacrifice rib $105$ to the outermost rib $101a$ of the tread $101$ suppressed, but also transmission of vibration or deformation generated during driving to the shoulder of the tread $101$ via a side wall is suppressed as much as possible.

Two types of decoupling grooves are generally used for the conventional truck or bus tire: one is a vertical-type structure wherein the decoupling groove $104$ is vertically formed in the outermost rib $101a$ of the tread $101$ as shown in FIG. 3.

This type of the decoupling groove is typically designed to allow the sacrifice rib $105$ to absorb the friction on the outermost rib $101a$. Here, the sacrifice rib $105$ has lower stiffness and more active movement than the outermost rib $101a$ under the same driving condition. As a result, increased friction and wear are concentrated on the sacrifice rib $105$, so that the irregular wear can be prevented from being transferred to the outermost rib $101a$ adjacent the sacrifice rib.

The other is a side-type structure wherein the decoupling groove $104$ is formed on a lateral side $102$ instead of on the tread $101$. The side type is functionally similar to the vertical type, but differs in that the decoupling groove $104$ is formed on the lateral side $102$ and has no sacrifice rib. In the side-type decoupling groove, contact pressure (i.e. vertical pressure) generated when an outward edge of the outermost rib $101$ contacts the ground is discontinuously and largely decreased by the decoupling groove $104$, which reduces friction between the outermost rib and the ground while suppressing wear of the outermost rib.

As described above, the two types of conventional decoupling grooves are first different in terms of position of the decoupling groove and function of suppressing uneven wear, and secondly are different in terms of a method of overcoming stone drilling.

SUMMARY OF THE INVENTION

The present invention is conceived to solve the problems of the conventional techniques as described above, and an aspect of the present invention is to provide a tire for trucks/buses, which has advantages over the conventional decoupling grooves and has an improved decoupling groove capable of suppressing irregular wear.

In accordance with one aspect of the present invention, a tire for a truck/bus having a decoupling groove formed between an outermost rib of a tread and a tread lateral side is provided, wherein an offset structure is provided by cutting off a portion around a start point where a virtual line extending from a distal end of the outermost rib of the tread intersects a virtual line extending from the tread lateral side, a side of the outermost rib is parallel to the tread lateral side, the cut-off portion is formed with a "<"-shaped groove, and a sacrifice rib protruding from the "<"-shaped groove is formed coplanar with the start point located on the virtual line extending from the tread lateral side.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Embodiments of the present invention will be described in detail with reference to the accompanying drawings.

Figure 1:
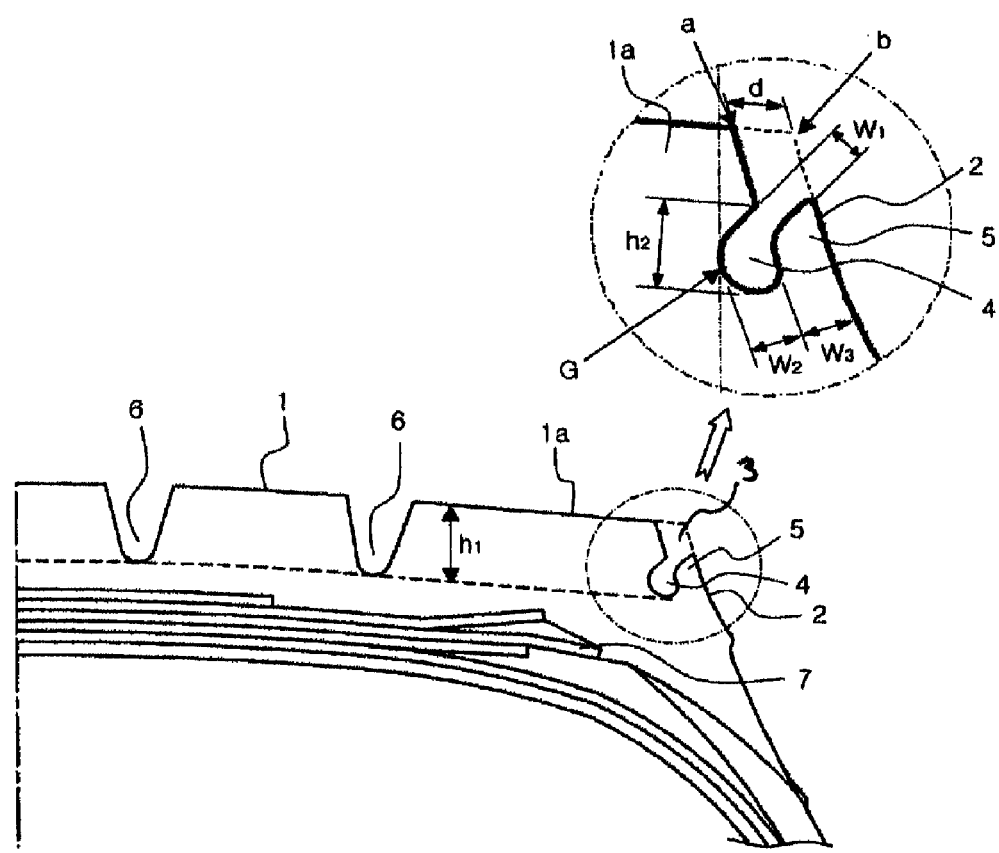
FIG. 1 is a partial cross-sectional view of a tire for a truck/bus having a decoupling groove according to one embodiment of the present invention.
Figure 2:
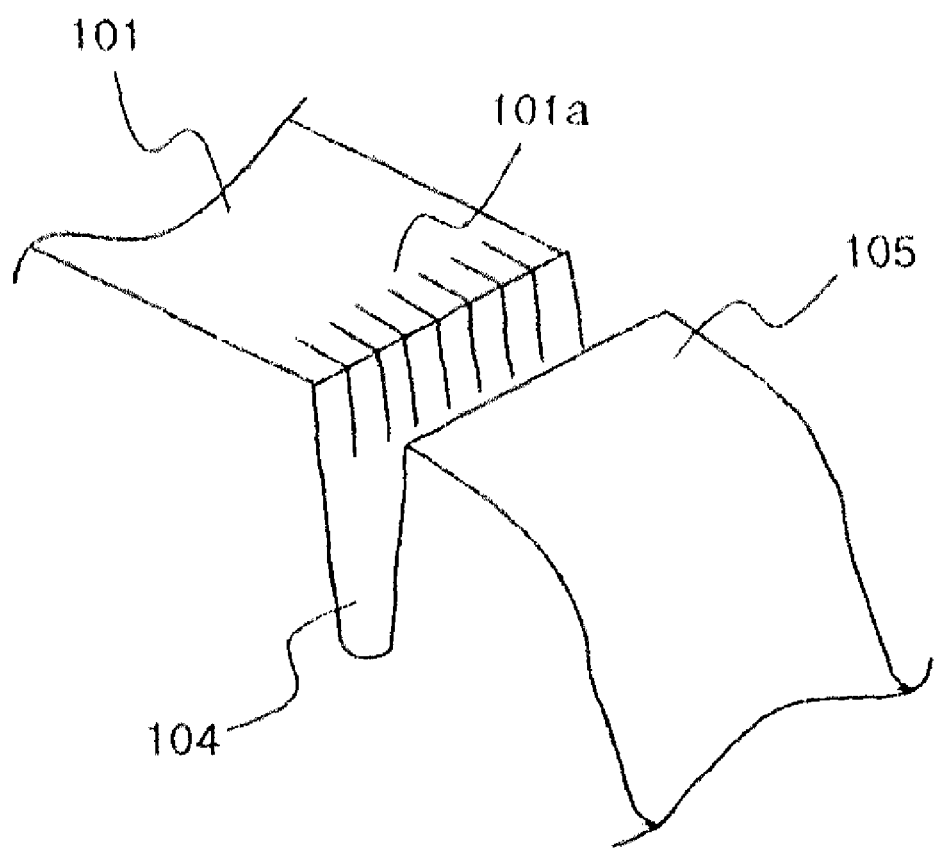
FIG. 2 is a partial perspective view of a conventional tire having a decoupling groove.
Figure 3:
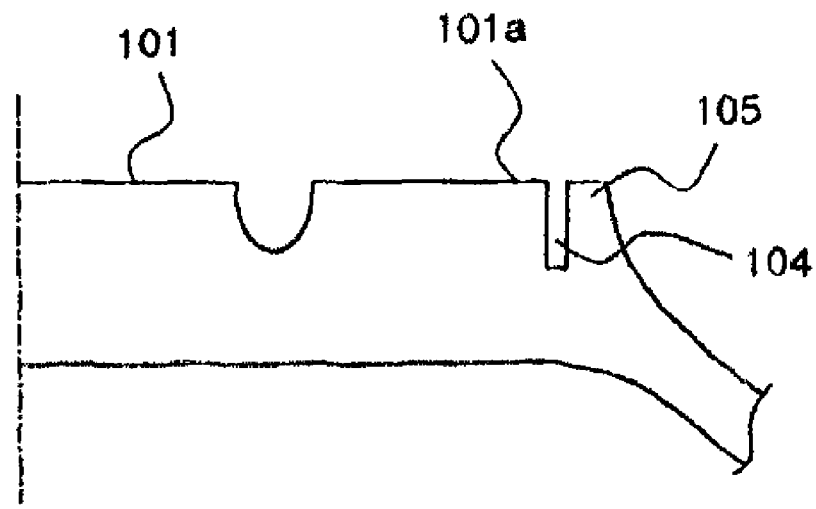
FIGS. 3 and 4 are partial cross-sectional views of tires with conventional decoupling grooves, respectively.
Figure 4:
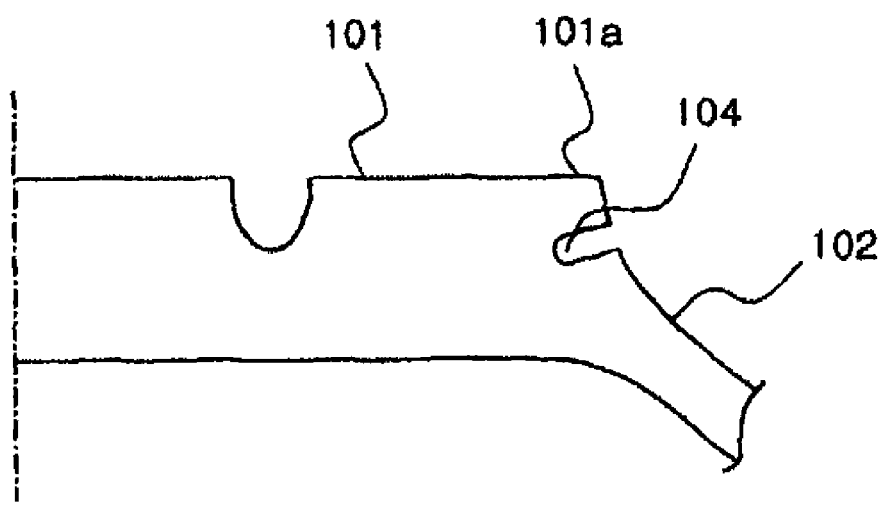

FIG. 1 is a partial cross-sectional view of a tire for a truck/bus having a decoupling groove according to one embodiment of the present invention.

According to one embodiment of the present invention, a tire for a truck/bus has a decoupling groove $3$ formed between an outermost rib $1a$ of a tread $1$ and a tread lateral side $2$. The tire has an offset structure wherein a portion around a start point "b" where a virtual line extending from a distal end "a" of the outermost rib $1a$ of the tread $1$ intersects a virtual line extending from the tread lateral side $2$ is cut off. Further, a side of the outermost rib $1a$ is parallel to the tread lateral side $2$; the cut-off portion is formed with a "<"-shaped groove $4$; and a sacrifice rib $5$ protruding, from the "<"-shaped groove $4$ is formed coplanar with the start point "b" located on the virtual line extending from the cut-open tread lateral side $2$.

Here, an offset distance "d" between the outermost rib 1a of the tread 1 and the tread lateral side 2 is 3~10 mm; a depth "$h_2$" of the "<"-shaped groove 4 is 30~70% of a depth "$h_1$" of a main groove 6 formed on the tread 1; and each of widths $W_1$ and $W_2$ is 2~7 mm. Further, the internal corner of the "<"-shaped groove 4 is generally rounded.

An innermost point G of the "<"-shaped groove 4 is located further inside than the distal end "a" of the outermost rib 1a of the tread 1, and a width $W_3$ of the sacrifice rib 5 is maintained equal to the offset distance d.

As shown in FIG. 1, to effectively suppress irregular wear of the tread 1, the offset structure is provided by cutting off the portion around the start point b where the virtual line extending from the distal end "a" of the outermost rib 1a of the tread 1 intersects the virtual line extending from the tread lateral side 2, so that the end of the tread 1 is located inward with respect to the entire side of a tire casing. Thus, variation in contact pressure on the outermost rib 1a of the tread 1 decreases in a width direction of the tread 1.

This configuration improves the function of discontinuously lowering the contact pressure (i.e., vertical pressure), which can affect the decoupling groove, while suppressing irregular wear thereof.

Further, since the decoupling groove takes the form of the "<"-shaped groove 4 and is thus changed into the form of a vertical-type decoupling groove after intermediate wear, the effect of the vertical-type decoupling groove appears after intermediate wear, that is, after the effect of the side-type decoupling groove begins to decrease, thereby suppressing the irregular wear until the final stage of wear.

Further, the sacrifice rib 5 maintains an outwardly protruded shape in a state wherein the portion of the start point "b" between the distal end "a" of the outermost rib 1a of the tread 1 and the tread lateral side 2 is cut in the offset structure. Therefore, the lateral side of the tread 1 is protected from a side portion, so that chipping is minimized. Further, when the decoupling groove acts as the vertical-type decoupling groove, an edge of the tread 1 is not formed with a sipe, which can be applied in the use of the vertical-type decoupling groove, thereby preventing chipping of the edge of the tread 1.

Further, the "<"-shaped groove 4 of the decoupling groove decreases deformation of a belt edge 7 while improving heat generating performance, thereby enhancing durability of the belt.

Figure 5:
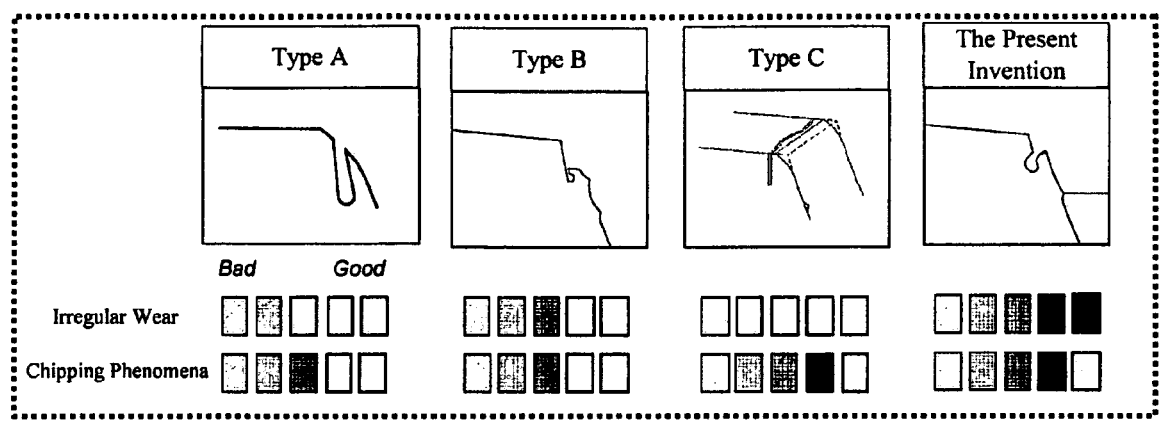
FIG. 5 shows results of testing a conventional tire having a typical decoupling groove and a tire having a decoupling groove according to the present invention in view of uneven wear and chipping phenomena.

Meanwhile, the tire according to the present invention and conventional tires with various decoupling grooves were tested in view of irregular wear and chipping phenomena, wherein tires having the same size of 297/75R22.5 as shown in FIG. 5 were used. Test results showed that the tire according to the present invention exhibited excellent performance.

As described above, the tire for the truck/bus according to the present invention has an improved decoupling groove capable of effectively suppressing irregular wear, preventing chipping of a tread edge, and decreasing deformation of a belt edge, which results in enhanced durability of the belt.

Although the present invention has been described with reference to the embodiments and the accompanying drawings, the present invention is not limited to the embodiments and the drawings. It should be understood that various modifications and changes can be made by those skilled in the art without departing from the spirit and scope of the present invention as defined by the accompanying claims.

What is claimed is:

1. A tire for a truck/bus having a decoupling structure formed in an offset structure comprising a decoupling groove formed between an outermost rib of the tread and a tread lateral side and a sacrificial rib having an outwardly protruding shape terminating in a point projecting from the tread lateral side, wherein the decoupling structure is formed by cutting off a portion around a start point "b" with a distance "d" which is measured between a virtual line extending from a distal end of the outermost rib of the tread and a virtual line extending from the tread lateral side, such that the end of the tread is located inward with respect to the entire side of a tire casing;

wherein the decoupling groove is formed with a depth h2 by a side of the outermost rib parallel to the tread lateral side and the sacrificial rib, wherein an internal corner of the decoupling groove is substantially rounded and an innermost point of the decoupling groove is located further inside than the distal end "a" of the outermost rib of the tread, wherein the decoupling groove is formed coplanar with the start point "b" located on the virtual line extending from the cut-open tread lateral side, and wherein the decoupling groove is changed into the form of a vertical-type decoupling groove after intermediate wear;

wherein a width ($W_1$) of the decoupling groove is smaller than a width ($W_2$) of a lower part of the decoupling groove; and wherein the sacrificial rib has a width ($W_3$) equal to the distance "d" and is formed coplanar with intersection of the virtual lines extending from the distal end of the outermost rib and the tread lateral side.

2. The tire according to claim 1, wherein the distance "d" ranges from 3 mm to 10 mm.

3. The tire according to claim 1, wherein the depth "$h_2$" of the decoupling groove is 30% to 70% of a depth "$h_1$" of a main groove formed on the tread.

4. The tire according to claim 1, wherein the widths ($W_1$, $W_2$) of the decoupling groove range from 2 mm to 7 mm.

* * * * *